United States Patent
Seki

(10) Patent No.: US 9,834,135 B2
(45) Date of Patent: Dec. 5, 2017

(54) LIGHTING APPARATUS

(71) Applicant: HONDA ACCESS CORP., Niiza-shi, Saitama (JP)

(72) Inventor: Kunihiko Seki, Niiza (JP)

(73) Assignee: HONDA ACCESS CORP., Niiza-shi (JP)

( * ) Notice: Subject to any disclaimer, the term of this patent is extended or adjusted under 35 U.S.C. 154(b) by 142 days.

(21) Appl. No.: 14/844,472

(22) Filed: Sep. 3, 2015

(65) Prior Publication Data

US 2016/0076757 A1    Mar. 17, 2016

(30) Foreign Application Priority Data

Sep. 11, 2014    (JP) .................................. 2014-185356

(51) Int. Cl.
| | | |
|---|---|---|
| *B60Q 1/068* | (2006.01) | |
| *B60Q 1/06* | (2006.01) | |
| *B60Q 1/20* | (2006.01) | |
| *F21S 8/10* | (2006.01) | |

(52) U.S. Cl.
CPC ............. *B60Q 1/20* (2013.01); *B60Q 1/0683* (2013.01); *F21S 48/1168* (2013.01); *F21S 48/1742* (2013.01); *F21S 48/33* (2013.01)

(58) Field of Classification Search
CPC .................................................. B60Q 1/0683
USPC ........................................................ 362/524
See application file for complete search history.

(56) References Cited

U.S. PATENT DOCUMENTS

| | | | | |
|---|---|---|---|---|
| 5,642,935 | A * | 7/1997 | Schmitt ................. | F21S 48/335 362/294 |
| 5,775,794 | A * | 7/1998 | Schmitt ................. | F21S 48/335 362/294 |
| 6,502,971 | B1 * | 1/2003 | Terao ..................... | B23P 19/06 362/267 |
| 6,746,142 | B2 | 6/2004 | Shirai | |

(Continued)

FOREIGN PATENT DOCUMENTS

| | | |
|---|---|---|
| CN | 201651995 U | 11/2010 |
| CN | 203464126 U | 3/2014 |

(Continued)

OTHER PUBLICATIONS

Office Action dated Aug. 10, 2016, issued in counterpart Taiwanese Patent Application No. 10520994290. (3 pages).

(Continued)

*Primary Examiner* — Andrew Coughlin
*Assistant Examiner* — Keith Delahoussaye
(74) *Attorney, Agent, or Firm* — Westerman, Hattori, Daniels & Adrian, LLP

(57) ABSTRACT

A lighting apparatus includes: a light source; a sealed housing accommodating the light source therein; and an aiming screw rotatably supported in a through-hole which extends through the housing. Therefore, an optical axis of light emitted from the light source can be adjusted by rotating the aiming screw. A breathing passage communicating inside and outside of the housing with each other is provided inside the aiming screw, so that it is unnecessary to separately provide a breathing passage, thereby enabling decrease in the number of parts, and simplification of the structure. Accordingly, breathing of the housing of the lighting apparatus is achieved using a simple and compact structure.

4 Claims, 6 Drawing Sheets

(56) References Cited

U.S. PATENT DOCUMENTS

| | | | | |
|---|---|---|---|---|
| 6,883,948 B2 * | 4/2005 | VanDuyn | ............... | F21S 48/335 |
| | | | | 362/267 |
| 2011/0192243 A1 * | 8/2011 | Tachiiwa | ............ | B29C 45/0025 |
| | | | | 74/89.23 |

FOREIGN PATENT DOCUMENTS

| JP | 5-34602 U | 5/1993 |
|---|---|---|
| JP | 2002-193023 A | 7/2002 |
| JP | 4517227 B2 | 8/2010 |
| JP | 2013-082430 A | 5/2013 |
| JP | 2013-203247 A | 10/2013 |

OTHER PUBLICATIONS

Office Action dated May 18, 2016, issued in counterpart Japanese Patent Application No. 2014-185356. (3 pages).

* cited by examiner

LIGHTING APPARATUS

BACKGROUND OF THE INVENTION

Field of the Invention

The present invention relates to a lighting apparatus comprising: a light source; a sealed housing accommodating the light source therein; and an aiming screw rotatably supported in a through-hole which extends through the housing, wherein an optical axis of light emitted from the light source is adjusted by rotating the aiming screw.

Description of the Related Art

Japanese Utility Model Registration No. 2528745 has made publicly known an optical axis adjuster in which a male thread of an aiming screw is screwed to a nut that is provided to a reflector swingably supported inside a housing of a vehicle headlamp, and an optical axis is adjusted, by rotating the aiming screw so as to push and pull the housing.

Furthermore, Japanese Patent Application Laid-open No. 2002-193023 has made publicly known an optical axis adjuster including a synthetic resin-made aiming screw.

Japanese Patent No. 4517227 has made publicly known an optical axis adjuster including an air-permeable, water-proof and dust-proof filter which is provided to a breathing passage communicating inside and outside of a housing with each other in order to prevent that air pressure inside the housing changes due to heat generation and cooling of a light source of a vehicle headlamp so that moisture and dust outside the housing are sucked into the inside of the housing when the air pressure decreases.

Meanwhile, providing the breathing passage to the housing of the vehicle headlamp, as described in Japanese Patent No. 4517227, causes problems such as a structure of the housing becoming complicated, and dimensions of the housing becoming larger.

SUMMARY OF THE INVENTION

The present invention has been made with the foregoing situation taken into consideration. An object of the present invention is to enable breathing of a housing of a lighting apparatus by using a simple and compact structure.

In order to achieve the object, according to a first aspect of the present invention, there is provided a lighting apparatus comprising: a light source; a sealed housing accommodating the light source therein; and an aiming screw rotatably supported in a through-hole which extends through the housing, wherein an optical axis of light emitted from the light source is adjusted by rotating the aiming screw, and a breathing passage communicating inside and outside of the housing with each other is provided inside the aiming screw.

According to the first aspect of the present invention, the lighting apparatus includes: the light source; the sealed housing accommodating the light source therein; and the aiming screw rotatably supported in the through-hole which extends through the housing. For this reason, the optical axis of the light emitted from the light source can be adjusted by rotating the aiming screw. The breathing passage communicating the inside and outside of the housing with each other is provided inside the aiming screw, so that it is unnecessary to separately provide a breathing passage. Accordingly, reduction of the size of the housing, decrease in the number of parts, and simplification of the structure can be achieved.

According to a second aspect of the present invention, in addition to the first aspect, a seal member is provided on an outer periphery of the aiming screw, the seal member abutting against an inner periphery of the through-hole, and the breathing passage includes a main passage passing through an inside of the seal member along an axis of the aiming screw, an inner opening communicating the main passage with the inside of the housing on one end side of the aiming screw, and a first outer opening communicating the main passage with the outside of the housing on an opposite end side of the aiming screw.

According to the second aspect of the present invention, the seal member is provided on the outer periphery of the aiming screw, the seal member abutting against the inner periphery of the through-hole; and the breathing passage includes the main passage passing through the inside of the seal member along the axis of the aiming screw, the inner opening communicating the main passage with the inside of the housing on the one end side of the aiming screw, and the first outer opening communicating the main passage with the outside of the housing on the opposite end side of the aiming screw. Therefore, moisture and dust can be blocked by the seal member from entering the inside of the housing via a gap between the inner periphery of the through-hole and the outer periphery of the aiming screw.

According to a third aspect of the present invention, in addition to the first or second aspect, an air-permeable, water-proof and dust-proof filter is provided in a part of the breathing passage.

According to the third aspect of the present invention, the air-permeable, water-proof and dust-proof filter is provided in the part of the breathing passage. For this reason, moisture and dust can be prevented by filtration of the filter from entering the inside of the housing while inhibiting, by using air passing through the filter, change in air pressure inside the housing due to heat generation and cooling of the light source.

According to a fourth aspect of the present invention, in addition to the third aspect, a fitting recessed portion is formed in the opposite end of the aiming screw, the filter is placed between the main passage open to a bottom portion of the fitting recessed portion and the first outer opening, and the filter is covered with a fitting member by fitting the fitting member into the fitting recessed portion, the fitting member including an engagement groove engageable with a tool used for adjusting the optical axis.

According to the fourth aspect of the present invention, the fitting recessed portion is formed in the opposite end of the aiming screw; the filter is placed between the main passage open to the bottom portion of the fitting recessed portion and the first outer opening; and the filter is covered with the fitting member by fitting the fitting member into the fitting recessed portion, the fitting member including the engagement groove engageable with the tool used for adjusting the optical axis. Thus, the filter can be protected by the fitting member while making it easy for the filter to be attached to the bottom portion of the fitting recessed portion, and it can be prevented that the filter is damaged by the tool when rotating the fitting member in order to adjust the optical axis.

According to a fifth aspect of the present invention, in addition to the fourth aspect, the fitting member is fixed to the fitting recessed portion by locking a lock claw provided to the fitting member into the first outer opening.

According to the fifth aspect of the present invention, the fitting member is fixed to the fitting recessed portion by locking the lock claw provided to the fitting member into the first outer opening. Thus, simplification of the structure can be achieved by using the first outer opening for fixing of the fitting member.

According to a sixth aspect of the present invention, in addition to the fourth aspect, a second outer opening communicating the main passage with the outside of the housing is formed from a passage groove which is formed in at least one of abutment surfaces of the fitting member and the fitting recessed portion.

According to the sixth aspect of the present invention, the second outer opening communicating the main passage with the outside of the housing is formed from the passage groove which is formed in at least one of the abutment surfaces of the fitting member and the fitting recessed portion. Accordingly, by adding the second outer opening by a simple structure, the number of outer openings is increased so as to be able to securely prevent clogging of the breathing passage.

According to a seventh aspect of the present invention, in addition to the first aspect, the lighting apparatus is a vehicle headlamp.

According to the seventh aspect of the present invention, the lighting apparatus is the vehicle headlamp. Thus, in the vehicle headlamp, decrease in the number of parts and simplification of the structure can be achieved.

Note that a bulb 21 of an embodiment corresponds to the light source of the present invention, and a Phillips screwdriver 34 of the embodiment corresponds to the tool of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

Descriptions will be hereinbelow provided for an embodiment of the present invention on the basis of FIGS. 1 to 6.

Figure 1:
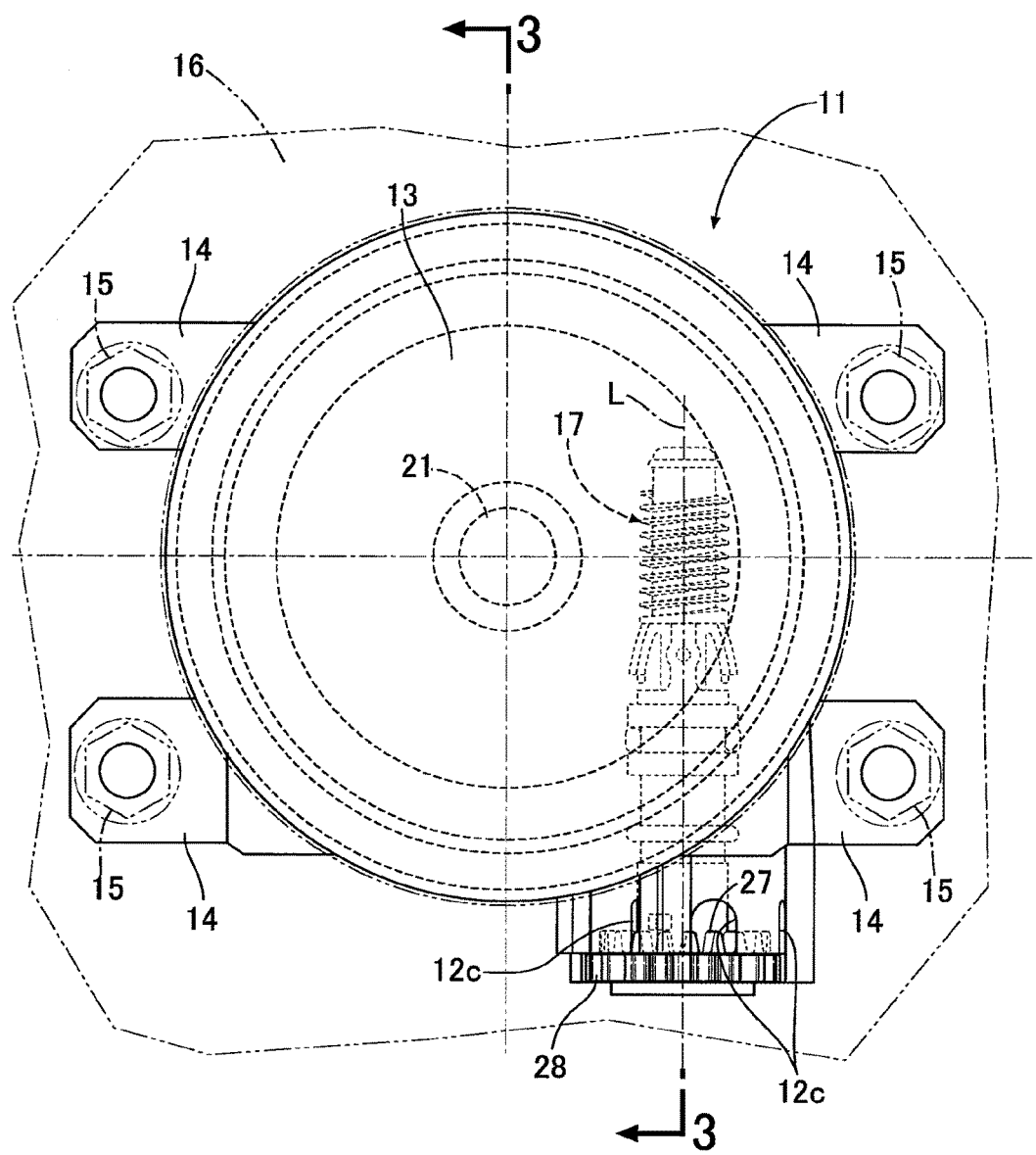
FIG. 1 is an elevation view of a fog lamp.
Figure 2:
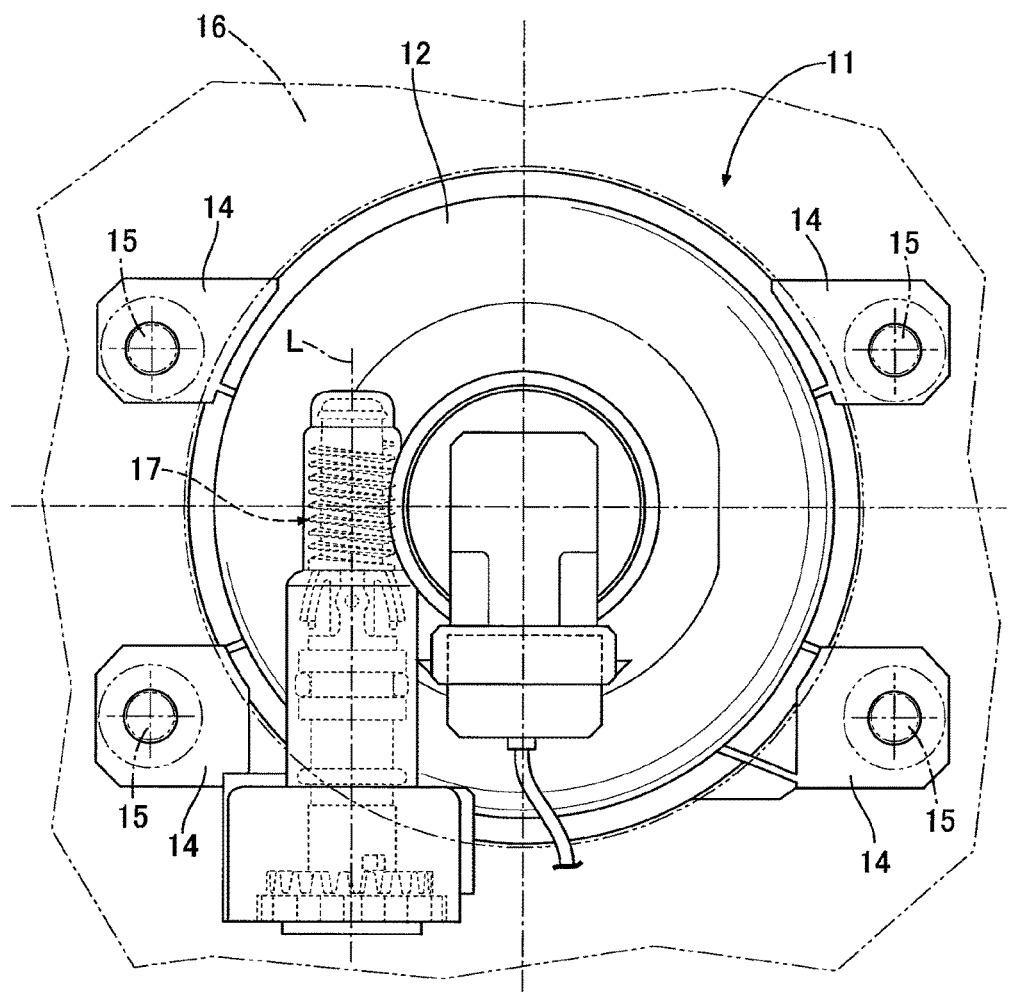
FIG. 2 is a rear view of the fog lamp.
Figure 3:
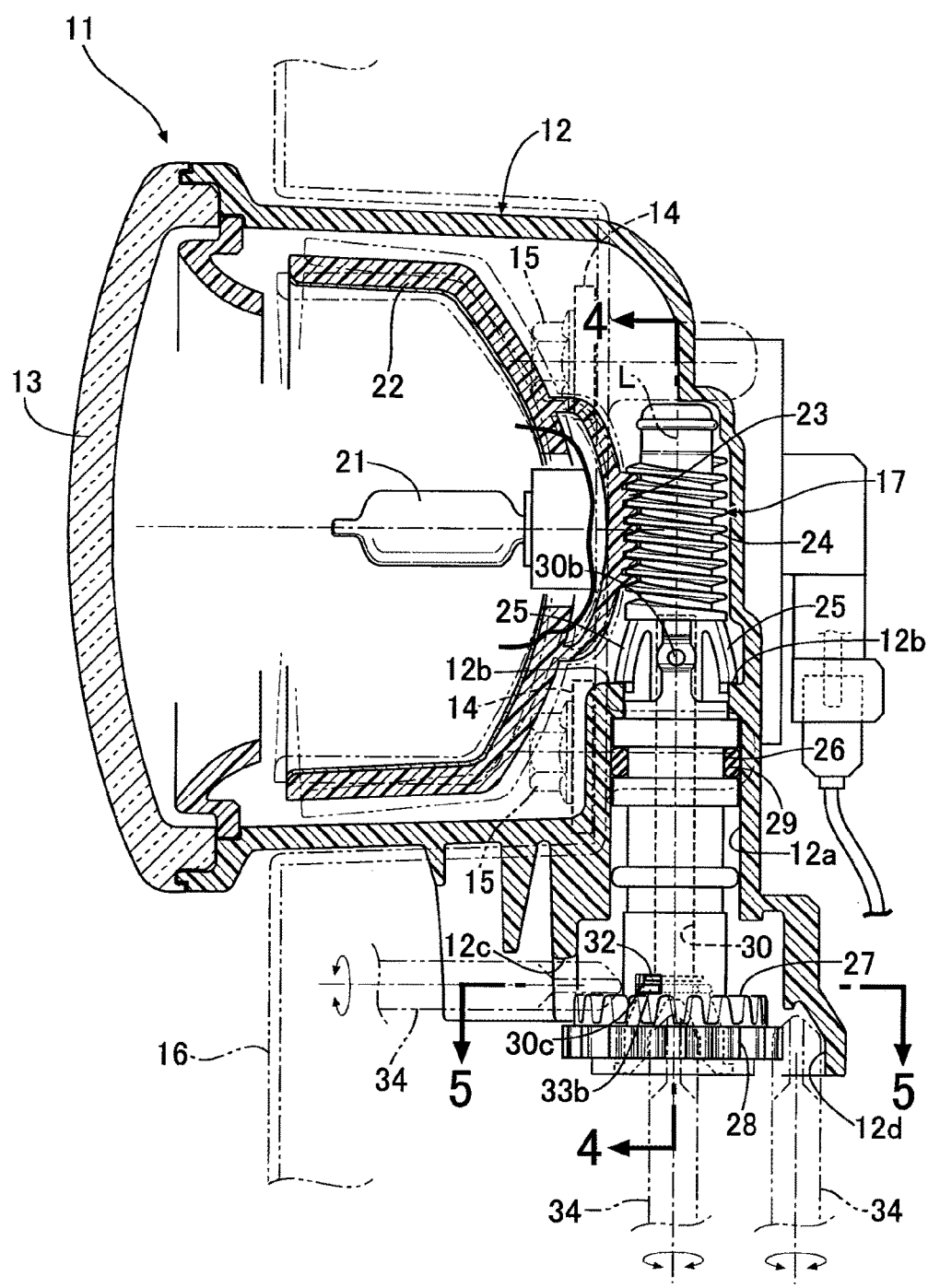
FIG. 3 is a sectional view taken along a line 3-3 in FIG. 1.
Figure 4:
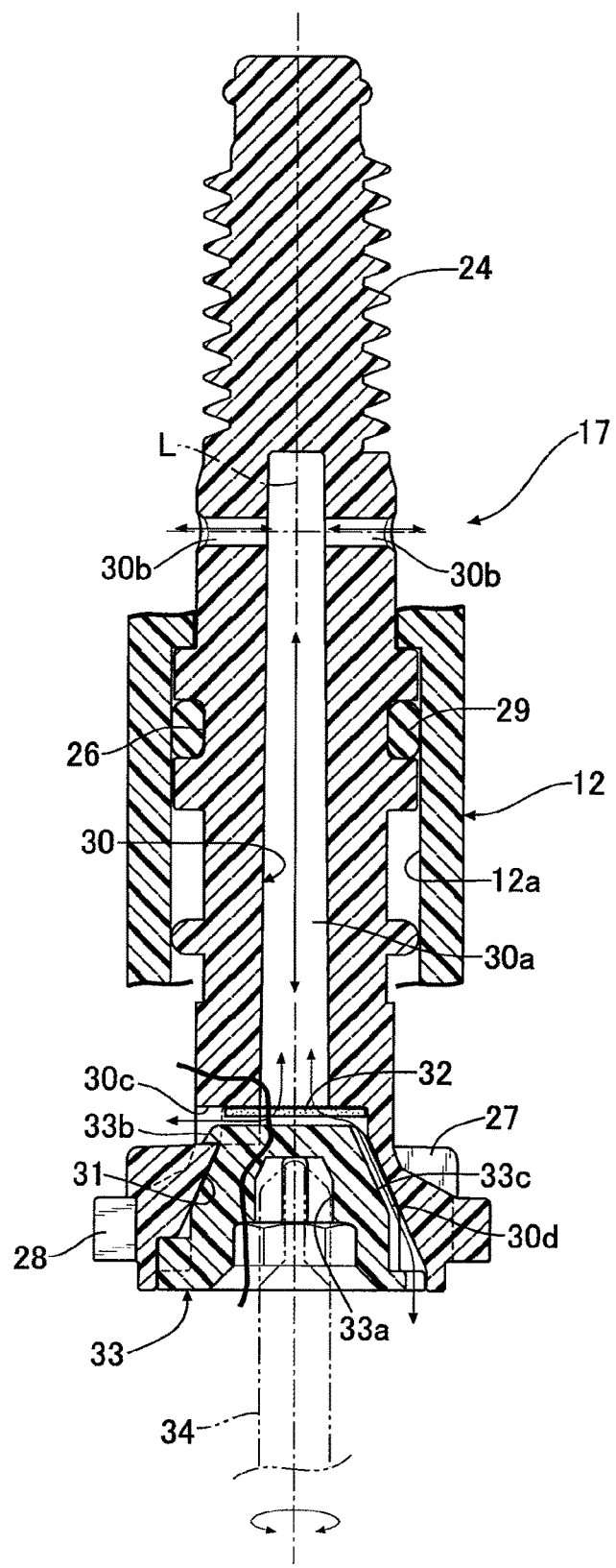
FIG. 4 is an enlarged sectional view taken along a line 4-4 in FIG. 3.
Figure 5:
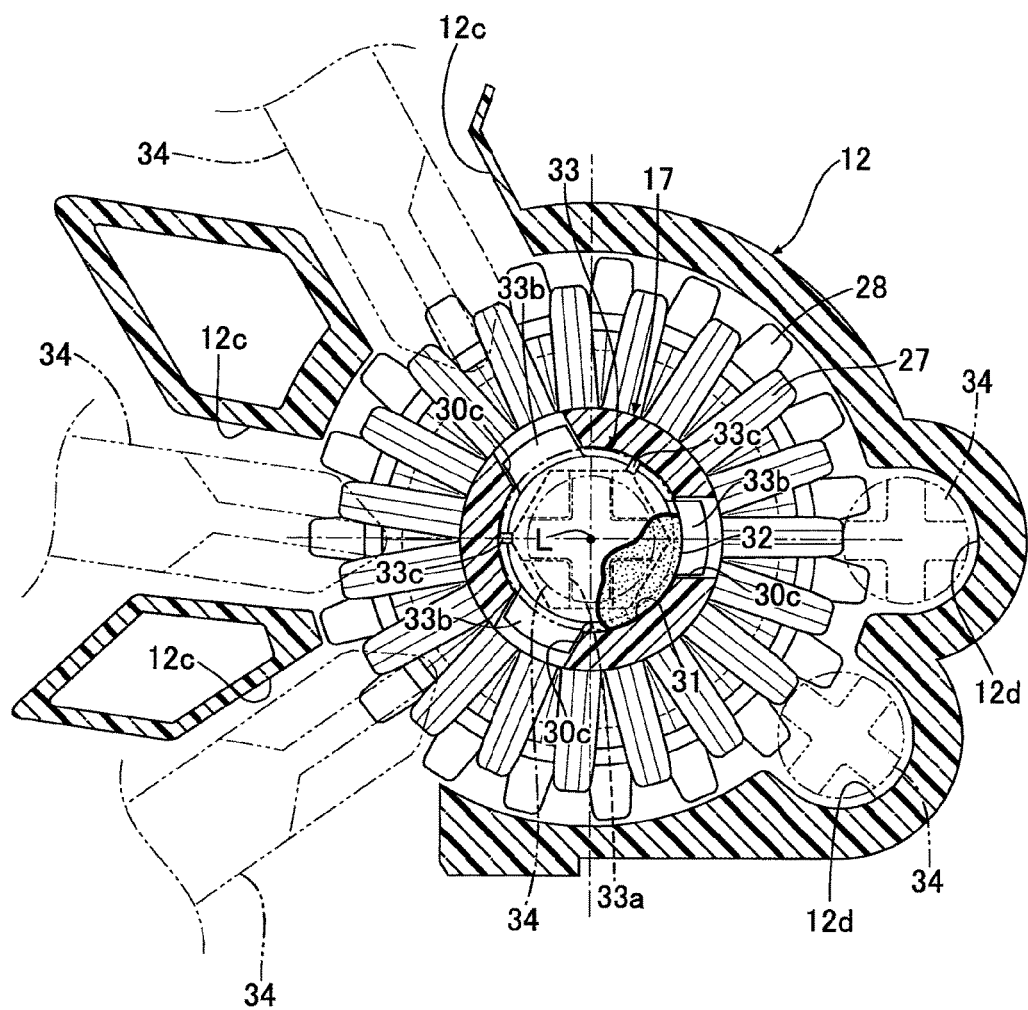
FIG. 5 is an enlarged sectional view taken along a line 5-5 in FIG. 3.
Figure 6:
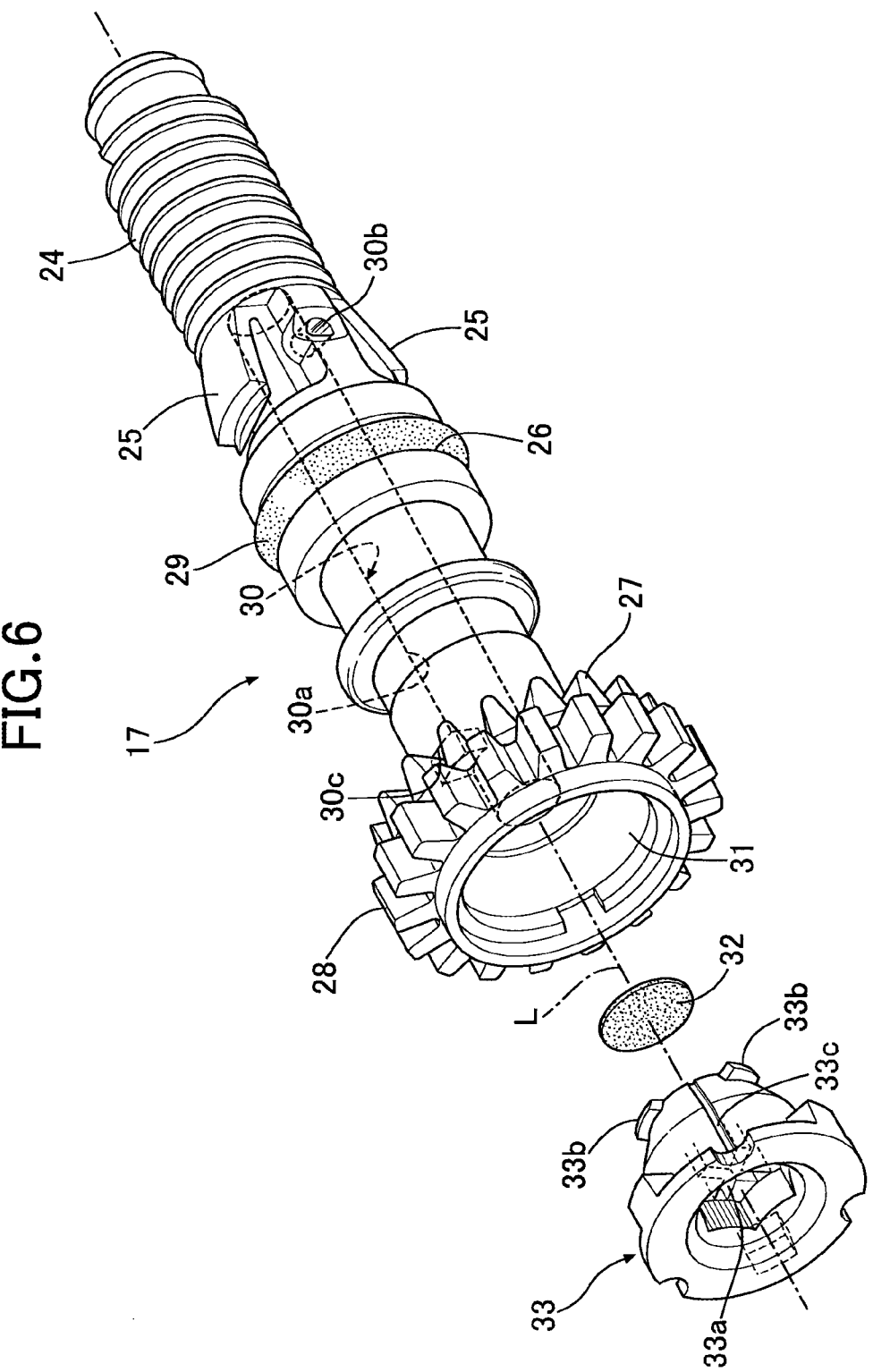
FIG. 6 is an exploded perspective view of an aiming screw.

As shown in FIGS. 1 to 3, a fog lamp 11 as a vehicle headlamp includes: a synthetic resin-made housing 12 having a bottomed cylindrical shape; and a lens 13 attached to a front opening of the housing 12. Four attachment brackets 14 protruding outward from the housing 12 are attached to a vehicle body 16 with bolts 15. A synthetic resin-made aiming screw 17 for adjusting an optical axis of the fog lamp 11 is provided to a rear surface of the housing 12.

As shown in FIG. 3, a bulb 21 as a light source, and a reflector 22 surrounding the bulb 21 are placed inside the housing 12. The reflector 22 is supported on the housing 12 via a support point not illustrated, so as to be swingable in an up-down direction. A worm 24 provided to an outer periphery on a tip end side in a direction of an axis L of the aiming screw 17 is meshed with a sector gear 23 provided to a rear portion of the reflector 22. Thus, when the aiming screw 17 is rotated, the reflector 22 swings around the support point so as to change a direction where light emitted from the bulb 21 is reflected by the reflector 22, thereby adjusting the optical axis of the fog lamp 11 in the up-down direction.

As shown in FIGS. 3 to 6, from the tip end side of the aiming screw 17, which is inserted into the inside of the housing 12, toward a base end side of the aiming screw 17 which is exposed to the outside of the housing 12, the aiming screw 17 includes the worm 24, a pair of elastically-deformable retaining arm portions 25, a ring-shaped seal member fitting groove 26, a bevel gear-shaped first gear 27 engageable with a teeth tip of a Phillips screwdriver 34, and a spur gear-shaped second gear 28 engageable with the teeth tip of the Phillips screwdriver 34. The aiming screw 17 is inserted into a through-hole 12a extending through the housing 12 in an inside-outside direction, while elastically deforming the pair of retaining arm portions 25 in a direction in which the retaining arm portions 25 approach each other. As a result, the pair of retaining arm portions 25 expand by their own elasticity so as to engage with a step portion 12b (see FIG. 3) of the through-hole 12a, so that the aiming screw 17 is rotatably supported in the through-hole 12a so as to be unmovable in the direction of the axis L. In addition, a seal member 29 made from an O-ring which is fitted into the seal member fitting groove 26 abuts against an inner peripheral surface of the through-hole 12a so that an internal space of the housing 12 is sealed from an external space.

A breathing passage 30 (see FIG. 4) communicating the internal space of the housing 12 with the external space is formed inside the aiming screw 17. The breathing passage 30 includes: a main passage 30a extending along the axis L of the aiming screw 17; two inner openings 30b branching from a tip end side of the main passage 30a toward the outside thereof in a radial direction, and opened between the worm 24 and the seal member fitting groove 26; and three first outer openings 30c branching from a base end side of the main passage 30a toward the outside thereof in the radial direction, and opened between the first gear 27 and the seal member fitting groove 26.

A fitting recessed portion 31 is formed in the base end of the aiming screw 17. A bottom portion of the fitting recessed portion 31 communicates with the main passage 30a and the first outer openings 30c of the breathing passage 30. A disk-shaped filter 32 made of a porous material is fixed, by adhesion or the like, to an end portion of the main passage 30a which is open to the fitting recessed portion 31. The filter 32 has a property of allowing passage of air but blocking passage of moisture and dust, and further has a property of blocking passage of steam molecules which are larger than air molecules.

While being fitted in the fitting recessed portion 31 of the aiming screw 17, a fitting member 33 is fixed to the fitting recessed portion 31 by locking three lock claws 33b to edges of the three first outer openings 30c, the fitting member 33 having a cross-shaped engagement groove 33a in a center thereof, and the cross-shaped engagement groove 33a being engageable with the teeth tip of the Phillips screwdriver 34. In this state, a clearance is formed between a tip end of the fitting member 33 and the filter 32, and the main passage 30a and the first outer openings 30c communicate with each other via the filter 32. Furthermore, three passage grooves 33c are formed in a surface of the fitting member 33 which abuts against the fitting recessed portion 31. The passage grooves 33c form three second outer openings 30d which communicate the main passage 30a of the breathing passage 30 with the outside.

Multiple first guide holes 12c (see FIG. 5) and multiple second guide holes 12d (see FIG. 5) are provided around the through-hole 12a of the housing 12, the first guide holes 12c guiding the teeth tip of the Phillips screwdriver 34 when the first gear 27 is manipulated by the Phillips screwdriver 34, and the second guide holes 12d guiding the teeth tip of the Phillips screwdriver 34 when the second gear 28 is manipulated by the Phillips screwdriver 34.

Next, descriptions will be provided for an operation of the embodiment of the present invention including the foregoing configuration.

Adjustment of the optical axis of the fog lamp 11 can be achieved by: engaging the teeth tip of the Phillips screwdriver 34 with the engagement groove 33a of the fitting member 33 such that the Phillips screwdriver 34 is in parallel to the axis L of the aiming screw 17; and then rotating the aiming screw 17. In addition, even when the Phillips screwdriver 34 is rotated, after inserting the teeth tip of the Phillips screwdriver 34 into one of the first guide holes 12c of the housing 12 such that the Phillips screwdriver 34 is orthogonal to the axis L of the aiming screw 17, the first gear 27 in mesh with the teeth tip of the Phillips screwdriver 34 rotates so as to rotate the aiming screw 17, thereby enabling the adjustment of the optical axis. Similarly, even when the Phillips screwdriver 34 is rotated, after inserting the teeth tip of the Phillips screwdriver 34 into one of the second guide holes 12d of the housing 12 such that the Phillips screwdriver 34 is in parallel to the axis L of the aiming screw 17, the second gear 28 in mesh with the teeth tip of the Phillips screwdriver 34 rotates so as to rotate the aiming screw 17, thereby enabling the adjustment of the optical axis.

As described above, adjustment work of the optical axis of the fog lamp 11 can be effectively performed by using one of the foregoing methods, depending on the condition of a work space around the fog lamp 11 attached to the vehicle body 16.

Meanwhile, when the bulb 21 of the fog lamp 11 is turned on, the inner pressure of the housing 12 become higher than the atmospheric pressure by air expansion due to heat generation. For this reason, the air inside the housing 12 is discharged to the outside via the breathing passage 30, and an excessive increase of the inner pressure of the housing 12 is inhibited. In this condition, when the bulb 21 of the fog lamp 11 is turned off, the inner pressure of the housing 12 becomes lower than the atmospheric pressure by contraction of the air due to cooling. For this reason, external air is sucked into the housing 12 via the breathing passage 30, and an excessive decrease in the inner pressure of the housing 12 is inhibited.

When the external air is sucked into the inside of the housing 12, if there is a gap between the through-hole 12a of the housing 12 and the aiming screw 17, the external air may be sucked into the inside of the housing 12 via this gap. However, the seal member 29 attached to the outer periphery of the aiming screw 17 prevents occurrence of the gap, and the inner openings 30b and the first and second outer openings 30c, 30d, of the breathing passage 30, are respectively opened on opposite end sides of the aiming screw 17 with the seal member 29 interposed between the inner openings 30b and the first and second outer openings 30c, 30d so that the air to be sucked into the inside of the housing 12 always surely passes through the breathing passage 30.

As described above, when the external air is sucked into the inside of the housing 12 via the breathing passage 30, the filter 32 placed in the breathing passage 30 catches moisture and dust included in the air so that the moisture and dust can be blocked from entering the inside of the housing 12. Since the filter 32 also catches steam included in the air, it is avoided that the steam is condensed inside the housing 12 so as to fog the lens 13.

According to the embodiment, as described above, the breathing passage 30 communicating the inside and outside of the housing 12 with each other is provided inside the aiming screw 17, so that it is unnecessary to separately provide the breathing passage 30. Accordingly, reduction of the size of the housing 12, decrease in the number of parts, and simplification of the structure can be achieved.

Furthermore, the fitting recessed portion 31 is formed in the base end of the aiming screw 17; the filter 32 is placed between the main passage 30a open to the bottom portion of the fitting recessed portion 31 and the first outer openings 30c; and the filter 32 is covered with the fitting member 33 which is fitted in the fitting recessed portion 31. For these reasons, the filter 32 is protected by the fitting member 33, while making it easy for the filter 32 to be attached to the bottom portion of the fitting recessed portion 31, so as to be able to be prevented from being damaged by the teeth tip of the Phillips screwdriver 34 when rotating the fitting member 33 for the purpose of adjusting the optical axis.

In addition, the fitting member 33 is fixed to the fitting recessed portion 31 by locking the lock claws 33b provided to the fitting member 33 into the first outer openings 30c. For this reason, simplification of the structure can be achieved by using the first outer openings 30c for fixing of the fitting member 33.

Moreover, the second outer openings 30d communicating the main passage 30a with the outside of the housing 12 are formed from the passage grooves 33c formed in the fitting member 33. For this reason, it is possible to add the second outer openings 30d by the simple structure so as to increase the number of outer openings, thereby securely preventing clogging of the breathing passage 30.

Besides, the periphery of the through-hole 12a extending through the housing 12 in the inside-outside direction is surrounded by the housing 12 itself, so that rainwater and the like dropping from above hardly enters the inside of the housing 12. Particularly, since the axis L of the aiming screw 17 is orthogonal to the optical axis so that the through-hole 12a is opened downward at the lower end of the housing 12, rainwater can be more securely prevented from entering the inside of the housing 12 from the through-hole 12a.

Although the foregoing descriptions have been provided for the embodiment of the present invention, various design changes can be made to the present invention within a scope not departing from the gist of the present invention.

For example, the lighting apparatus of the present invention is not limited to the automobile fog lamp 11 of the embodiment. The lighting apparatus of the present invention may be an arbitrary lighting apparatus such as an automobile headlamp and the like, and may be a lighting apparatus for use other than automobile use.

In addition, although in the embodiment, the filter 32 is placed between the main passage 30a and the first outer openings 30c, the filter 32 may be instead placed at an arbitrary place in the breathing passage 30.

Furthermore, although in the embodiment, the second outer openings 30d are formed from the passage grooves 33c provided on the fitting member 33 side, the second outer openings 30d may be instead formed from passage grooves which are provided on the fitting recessed portion 31 side of the aiming screw 17.

Moreover, the light source of the present invention is not limited to the bulb 21 of the embodiment, and may be an arbitrary light source such as an LED and the like.

Besides, the tool of the present invention is not limited to the Phillips screwdriver 34 of the embodiment, and may be arbitrary tools such as a flat-blade screwdriver, a hexagonal wrench and the like.

Further, although in the embodiment, the tip end of the main passage 30a terminates on the axis L of the aiming screw 17, the tip end of the main passage 30a may penetrate through the aiming screw 17.

What is claimed is:

1. A lighting apparatus comprising:
   a light source;
   a sealed housing accommodating the light source therein; and
   an aiming screw rotatably supported in a through-hole which extends through the housing, wherein
   an optical axis of light emitted from the light source is adjusted by rotating the aiming screw,
   a breathing passage communicating inside and outside of the housing with each other is provided inside the aiming screw,
   an air-permeable, water-proof and dust-proof filter is provided in a part of the breathing passage,
   a fitting recessed portion is formed in the opposite end of the aiming screw,
   the filter is placed between a main passage of the breathing passage open to a bottom portion of the fitting recessed portion and a first outer opening of the breathing passage,
   the filter is covered with a fitting member by fitting the fitting member into the fitting recessed portion, the fitting member including an engagement groove engageable with a tool used for adjusting the optical axis, and
   the fitting member is fixed to the fitting recessed portion by locking a lock claw provided to the fitting member into the first outer opening.

2. The lighting apparatus according to claim 1, wherein:
   a seal member is provided on an outer periphery of the aiming screw, the seal member abutting against an inner periphery of the through-hole, and
   the breathing passage includes
   the main passage passing through an inside of the seal member along an axis of the aiming screw,
   an inner opening communicating the main passage with the inside of the housing on one end side of the aiming screw, and
   the first outer opening communicating the main passage with the outside of the housing on an opposite end side of the aiming screw.

3. The lighting apparatus according to claim 1, wherein a second outer opening communicating the main passage with the outside of the housing is formed from a passage groove which is formed in at least one of abutment surfaces of the fitting member and the fitting recessed portion.

4. The lighting apparatus according to claim 1, wherein the lighting apparatus is a vehicle headlamp.

* * * * *